Aug. 1, 1933.    M. CHOUINARD ET AL    1,920,840
HOSE NOZZLE
Filed Nov. 23, 1931

INVENTOR.
J. P. Paradis & M. Chouinard
By E. J. Featherstonhaugh
ATTORNEY.

Patented Aug. 1, 1933

1,920,840

UNITED STATES PATENT OFFICE 1,920,840

HOSE NOZZLE

Michel Chouinard, Montreal, and Joseph Philippe Paradis, Longueuil, Quebec, Canada, said Paradis assignor to said Chouinard Application November 23, 1931. Serial No. 576,866

4 Claims. (Cl. 299—131)

The invention relates to a hose nozzle, as described in the present specification and illustrated in the accompanying drawing that form part of the same.

The invention consists essentially in the construction and operation of the opening and closing member and the means employed in the direction of the flow as pointed out in the claims for novelty following a description in detail of the parts contributing to the desired result.

The objects of the invention are to facilitate the handling of a hose used in the delivery of water for various purposes and particularly a hose used for watering lawns and gardens, paths and roadways, and to employ a spray where wanted and a direct stream at other places and to do this without making any other change than the adjustment of the release member, thereby enabling the gardeners and others to use their discretion in so far as the stream or the spray are concerned; to simplify the construction of a hose nozzle delivering a stream, as well as a spray, and bring the device down to a comparatively few parts that will securely hold the water back and that will also permit the delivery of a very free stream or a very wide spray; to eliminate any coaction between spray members and the valve mechanism, other than the force of water released by the opening of the valve through its rotation; to insure the production of a hose nozzle at a low cost and yet maintain its efficiency and its comparative freedom from repairs and replacements; and generally to provide a simple, economical and durable device.

In the drawing, Figure 1 is a side elevational view of the hose nozzle.

Like numerals of reference indicate corresponding parts in the various figures.

Figure 1:
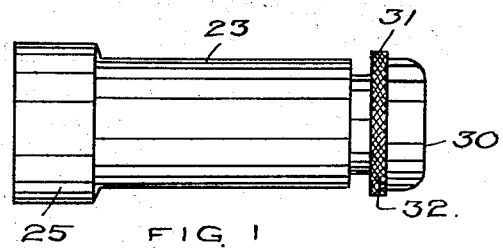
Figure 3:
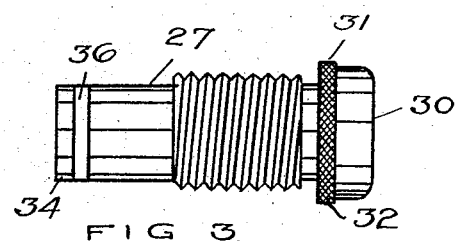
Figure 3 is an elevational detail of the valve body.
Figure 4:
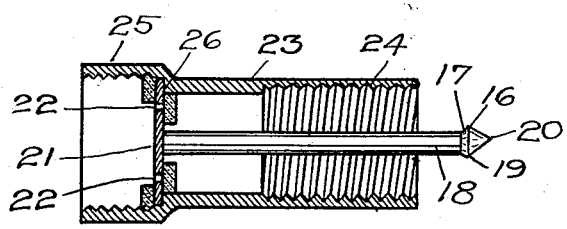
Figure 4 is a sectional detail of the valve casing body.
Figure 6:
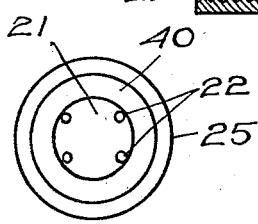
Figure 6 is a plan view of the sleeve end of the barrel casing.
Figure 5:
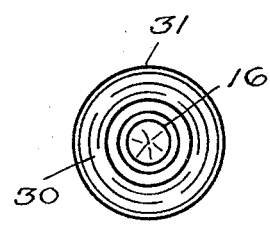
Figure 5 is a plan view of the nozzle head and spray head.
Figure 2:
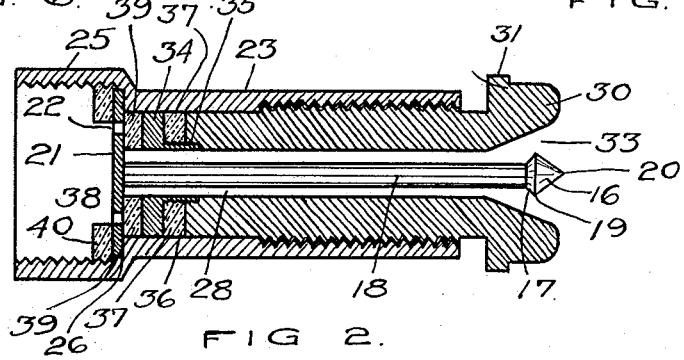
Figure 2 is an enlarged longitudinal sectional view of the hose nozzle.

Referring to the drawing, the spray member indicated by the numeral 16 is in the shape of an arrow head forming an under surface 17 from which the shaft or stem 18 extends, this under surface deflecting the stream of water for the spray, while the periphery 19 tapering to the point 20 contributes to the solid stream on housing the arrow head as explained hereinafter.

The stem at its inner end is rigid with the disc 21 this disc 21 having the apertures 22 forming the water outlets.

The valve casing 23 is preferably of barrel shape and is internally threaded at 24 for a portion of its length, flaring at the inner end to the enlarged and threaded sleeve joint member 25 in which the seat 26 is made for attaching the disc 21 rigidly thereto.

The rotary valve body 27 is externally threaded for the greater part of its length and is contained in the casing 23 and screws inwardly and outwardly. This valve body 27 is formed with the central bore 28 through which the shaft or stem 18 extends, the inner end of this bore being threaded, while the outer end flares to form the nozzle head 30 which is encircled by the annular flange 31 knurled as shown at 32 for convenience in operating the valve body, and thereby adjusting the recess 33 in the head 30 and the bore 28 in the valve body in respect to the fixed spray head 16.

The valve head 34 is formed with the threaded nipple 35 and is screwed into the internal thread of the bore 28 of the valve body and the washer 36 encircles the nipple 35 and extends to the inner smooth portion 37 of the casing wall, thereby forming a packing in preventing the water reaching the threads of the casing and valve, there being a clear passage 38 for the water through said valve head.

The washer 39 widely encircles the stem 18 inside the valve head 34 and engages the apertured disc 21 to close the apertures 22 at the extreme end of the inner movement of the valve body.

It will now be seen that in the operation of this hose nozzle, on attaching the reduced inner end of the casing 23 to the hose coupling member, the water flows against the apertured disc 22 and when the valve body is screwed to its inmost position, no water can escape, but on opening the valve, the water flows through the apertures 22 and through the central hole in the washer 39 and on through the central passage in the valve head 34 around the stem 18.

This water flows outwardly to the flaring recess in the nozzle head and is there deflected by the inner surface of the spray arrow head 16. In order to regulate the spray, the valve body is turned by means of the knurled flange until the head 16 is brought completely within the bore 28 and when it is well within the bore, then this spray is converted into a solid stream through the arrow head formation of the spray member.

The washer 40 securely holds the disc 21 in the threaded joint end 25.

What we claim is:

1. A hose nozzle comprising a barrel casing containing a central stem having a spear head carrying at its lower end a closure for the bottom of the casing with ports therethrough, a flange disc valve mounted on a rubber compressible gasket and carrying on the outer side a compressible gasket guarded by said flange, a spray member having a flaring outlet in the head cooperating with said spear head in forming a spray, and having an annular unobstructed outlet passage through the body joining said flaring mouth and forming a water passage beginning at the ports in said closure, means for turning said body in said valve casing and engaging said disc valve and a locking member securing said closure to the bottom of said valve casing.

2. A hose nozzle comprising a valve casing having an internal thread for a portion of its length and extending into a sleeve joint member threaded internally, a closure seated at the bottom of said casing and having outlet ports therefrom, a disc valve having a compressible washer closing said ports and an outer washer engaging the wall of said casing, a screw plug member engaging said outer washer and externally threaded and having an unobstructed water passage therethrough, a pin having a spear head in the outer portion of said passage and rigidly secured to said closure and a locking washer introduced in said sleeve joint and securing said closure to said casing.

3. In a hose nozzle, an externally threaded barrel having a suitable discharge head, a stem having a shoulder at the outer end cooperating with said head and extending through said barrel, a valve, a barrel valve casing surrounding the aforesaid valve and having a threaded connection therewith and extending therebeyond into a sleeve joint internally threaded, a closure secured to said stem at its inwardly projecting end and seated on said outer barrel at the inner end thereof and having ports therethrough, a compressible washer securing said closure to the valve casing, a disc valve mounted on a compressible washer closing said ports and having an upwardly extending inner flange spaced from said stem and threaded externally and a compressible washer secured in said threaded flange and abutting said barrel.

4. In a hose nozzle, an inner threaded barrel turning in an outer threaded barrel and having a head with a knurled surface for turning purposes, said inner barrel being stopped at one end and having ports therethrough and leading to the interior of said inner barrel, compressible gaskets, one closing said ports and the other engaging the inner surface of the outer barrel, a disc separating said gaskets and holding the outer gasket to the outer barrel wall, and a guiding stem suitably secured and projecting through said inner barrel and causing an annular unobstructed stream to flow from the mouth of said inner barrel.

MICHEL CHOUINARD.
JOSEPH PHILIPPE PARADIS.